United States Patent [19]

Okada

[11] 3,906,246

[45] Sept. 16, 1975

[54] TRANSISTOR CONTROL CIRCUIT

[75] Inventor: Takashi Okada, Yamato, Japan

[73] Assignee: Sony Corporation, Tokyo, Japan

[22] Filed: June 18, 1974

[21] Appl. No.: 480,367

[30] Foreign Application Priority Data

June 20, 1973 Japan ................................ 48-69549

[52] U.S. Cl. ................ 307/229; 328/160; 235/194

[51] Int. Cl.$^{2}$ ........................................ G06G 7/16

[58] Field of Search .................... 307/229, 230, 237; 235/194; 330/22, 25, 30 R, 30 D, 30 M; 328/160, 161

[56] References Cited

UNITED STATES PATENTS

| | | | |
|---|---|---|---|
| 3,440,441 | 4/1969 | Ley | 328/160 |
| 3,614,411 | 10/1971 | Henderson | 307/229 |
| 3,629,567 | 12/1971 | Bruggemann | 235/194 |
| 3,805,092 | 4/1974 | Henson | 307/229 |

*Primary Examiner*—Michael J. Lynch
*Assistant Examiner*—B. P. Davis
*Attorney, Agent, or Firm*—Lewis H. Eslinger; Alvin Sinderbrand

[57] ABSTRACT

A transistor control circuit capable of functioning in various modes of operation. The circuit is comprised of four interconnected transistors and three current sources such that the collector currents of the respective transistors admit of the relationship wherein the product of first and second collector currents is equal to the product of third and fourth collector currents such that the output collector current is a function of the first, second and third collector currents. At least one of the current sources includes a signaling source for supplying an input signal current, another of said current sources includes a controllable current source and the other of said current sources comprises a fixed current source. The resultant output collector current can thus be controlled to be proportional to the product of the input signal current and the controlled current, and can be controlled to be proportional to the quotient of the input signal current divided by the controlled current.

13 Claims, 11 Drawing Figures

TRANSISTOR CONTROL CIRCUIT

BACKGROUND OF THE INVENTION

This invention relates to a transistor control circuit and, in particular, to an improved transistor control circuit that is capable of functioning in various modes of operation so as to be used as an automatic gain control circuit, a multiplier circuit, and the like.

Various types of transistor control circuits have heretofore been proposed. Generally, transistor control circuits are useful in that various operations can be performed by the same circuit depending upon the input conditions. In one such prior art transistor control circuit a variable control voltage is applied across the respective base electrodes of two transistors having their emitters connected in common and to a third transistor which is supplied with an input signal. The gain of such circuit is controlled by varying the control voltage. An output signal can thus be derived that is proportional to the input signal yet having a controlled amplitude which is dependent upon the magnitude of the control voltage.

An attendant disadvantage of this prior art control circuit is that the change in the gain thereof is not proportional to the change in the control voltage. Consequently, the usefulness of this control circuit is somewhat limited because this lack of proportionality prevents that circuit from finding application as a multiplier. Another disadvantage is that since the loop gain of this control circuit depends upon the magnitude of the control voltage, the loop gain is not constant. Accordingly, this circuit does not admit of a desirable transient response.

OBJECTS OF THE INVENTION

Therefore, it is an object of the present invention to provide an improved transistor control circuit which is capable of being used as a gain control circuit, a multiplier circuit, and the like.

Another object of this invention is to provide an improved transistor control circuit admitting of various modes of operation depending upon the selective application thereto of an input signal and a control current.

Yet another object of this invention is to provide an improved transistor control circuit capable of various applications depending upon the particular circuit locations to which an input signal and a control current are supplied.

It is a further object of this invention to provide an improved transistor control circuit wherein a desired control characteristic curve can be attained thereby merely by supplying a fixed current to an appropriate circuit location.

A still further object of the present invention is to provide an improved transistor control circuit which can be readily fabricated in the form of an integrated circuit and which exhibits desirable temperature characteristics.

An additional object of this invention is to provide an improved transistor control circuit admitting of simple construction and exhibiting various operating characteristics which can be selected in accordance with the particular application of various currents thereto.

Various other objects and advantages of the present invention will become clear from the ensuring description and the novel features thereof will be pointed out in the appended claims.

SUMMARY OF THE INVENTION

A transistor control circuit comprised of a first transistor having a base electrode connected to the emitter electrode of a second transistor, a third transistor having a base electrode connected to the base electrode of the second transistor and a fourth transistor having a base electrode connected to the emitter electrode of the third transistor; a first current source to cause a first current to flow through the first transistor; a second current source connected to the emitter electrode of the second transistor; and a third current source connected to the emitter electrode of the third transistor; and wherein the base electrode of the second transistor is connected to the collector electrode of the first transistor; so that an output signal is derived from the collector electrode of the fourth transistor which is a function of the currents supplied by the current sources.

BRIEF DESCRIPTION OF THE DRAWINGS

The following detailed description of the present invention will be best understood in conjunction with the accompanying drawings in which.

DETAILED DESCRIPTION OF CERTAIN OF THE PREFERRED EMBODIMENTS

Figure 1:
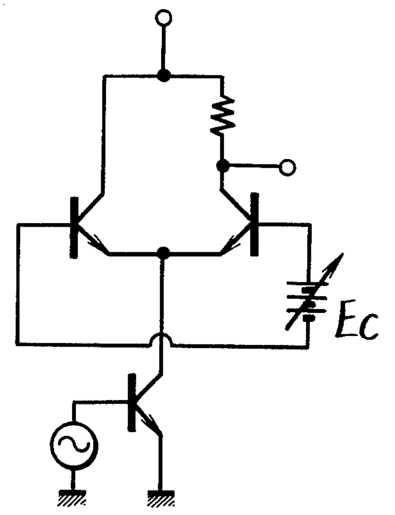
FIG. 1 (PRIOR ART)
FIG. 1 is a schematic diagram depicting a prior art transistor control circuit.

The improved transistor control circuit of the present invention will be readily appreciated by first describing a typical prior art transistor control circuit. One such circuit is illustrated in FIG. 1 wherein an input signal is supplied from a source $S_{in}$ to the control circuit and an output signal $S_{out}$ is derived having a controlled amplitude which depends upon a control voltage here depicted as the variable DC voltage source $E_C$. As the control voltage $E_C$ is varied, the gain of the circuit is varied. However, as noted above, the change in the gain of the illustrated circuit is not proportional to the change of the control voltage $E_C$. Also, since the loop gain is dependent upon the control voltage $E_C$, the loop gains is not constant so that the transient response of the illustrated circuit is less than desirable.

Figure 2:
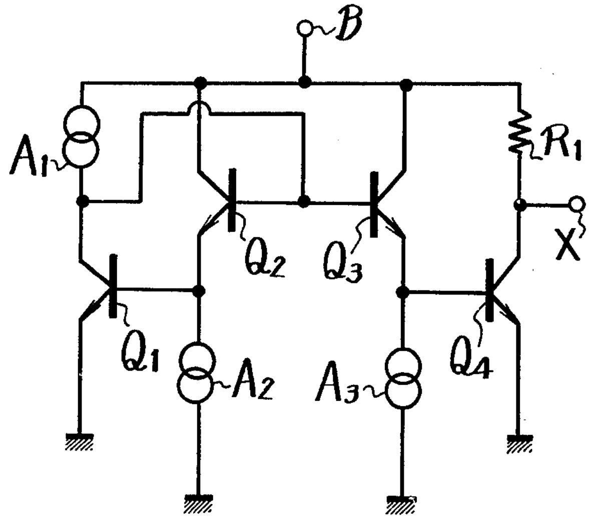
FIG. 2 is a schematic diagram depicting the underlying principles of the transistor control circuit of the present invention.

The disadvantages of the prior art transistor control circuit are overcome by the improved circuit of the present invention as illustrated in FIG. 2. It is seen that the improved circuit is comprised of four transistors $Q_1 - Q_4$ and three current sources $A_1 - A_3$. Each transistor is intended to be merely representative of a transistor device so that various equivalent devices that might consist of a plurality of interconnected semiconductor devices can be substituted for each or various ones of the illustrated transistors. As shown, the transistor $Q_1$ includes an emitter electrode which is connected to a source of reference potential such as ground. A collector electrode of the transistor is connected through the first current source $A_1$ to a source of energizing potential B. The source of energizing potential is adapted to supply a positive DC voltage to the illustrated circuit.

A second transistor $Q_2$ includes a collector electrode coupled to the source of energizing potential B and an emitter electrode connected to the base electrode of the transistor $Q_1$. Additionally, the second current source $A_2$ is connected to the emitter electrode of the transistor $Q_2$, the current source $A_2$ being coupled to ground. The base electrode of the transistor $Q_2$ is connected to the base of the transistor $Q_3$, the common connected base electrodes being connected as a feedback circuit to the collector electrode of the transistor $Q_1$ so as to provide a desirable operating point for the transistor control circuit.

The collector electrode of the transistor $Q_3$ is connected to the source of energizing potential B, and the emitter electrode of the transistor is connected to the third current source $A_3$. The emitter electrode of the transistor $Q_3$ is additionally connected to the base electrode of the transistor $Q_4$, and the current source $A_3$ is coupled to ground. An output terminal X is connected to the collector electrode of the transistor $Q_4$ and is adapted to derive an output signal thereat. The collector-emitter circuit of the transistor $Q_4$ is connected in series with a load resistor $R_1$ to the source of energizing potential. As is apparent, the source of energizing potential is adapted to supply operating voltages across the illustrated transistor control circuit and, in particular, to supply first energizing potentials to the transistors $Q_2$ and $Q_3$ and second energizing potentials to the transistors $Q_1$ and $Q_4$. As shown, the first energizing potentials are supplied to the transistor collector electrodes and the second energizing potentials are supplied to the transistor emitter electrodes.

In the illustrated circuit, the base currents of the respective transistors are relatively small when compared to the collector currents thereof so that the following equations describe the respective base-emitter forward bias voltages of the transistors:

$$V_{be1} = \frac{KT}{q} \ln \frac{I_1}{I_S} \quad (1)$$

$$V_{be2} = \frac{KT}{q} \ln \frac{I_2}{I_S} \quad (2)$$

$$V_{be3} = \frac{KT}{q} \ln \frac{I_3}{I_S} \quad (3)$$

$$V_{be4} = \frac{KT}{q} \ln \frac{I_4}{I_S} \quad (4)$$

where $V_{be1}$, $V_{be2}$, $V_{be3}$ and $V_{be4}$ are base-emitter forward bias voltages of the transistors $Q_1$, $Q_2$, $Q_3$ and $Q_4$, $I_1$, $I_2$ and $I_3$ are currents supplied from the current sources $A_1$, $A_2$ and $A_3$, and $I_4$ is a current flowing through the resistor $R_1$. Further, K is the Boltzmann's constant, $q$ is the electric charge of an electron, T is the absolute temperature, and $I_S$ is a function of emitter reverse-current at a time when the collector electrodes of the transistors $Q_1$, $Q_2$, $Q_3$ and $Q_4$ are respectively disconnected from the circuit.

Those of ordinary skill in the art recognize that the Boltzmann's constant K, the absolute temperature T and the electron charge $q$ are identical for each of the transistors $Q_1$ – $Q_4$. Furthermore, the emitter reverse-current $I_S$ can be considered to be constant if the respective characteristics of the illustrated transistors are substantially uniform. This uniformity is readily attained by selecting matched transistor components and is inherent in the fabrication of the transistor control circuit as an integrated circuit.

It is apparent from an inspection of the circuit of FIG. 2 that the base-emitter voltages of the illustrated transistors must conform to the following equation:

$$V_{be1} + V_{be2} = V_{be3} + V_{be4} \quad (5)$$

Now, if the above equations (1) to (4) are substituted for equation (5), the following equation is obtained:

$$\ln \frac{I_1}{I_S} + \ln \frac{I_2}{I_S} = \ln \frac{I_3}{I_S} + \ln \frac{I_4}{I_S} \quad (6)$$

It is recognized that equation (6) can be rewritten to form the following:

$$I_1 \cdot I_2 = I_3 \cdot I_4 \quad (7)$$

Thus, in accordance with the circuit illustrated in FIG. 2, it is readily apparent that the interconnected transistors exhibit the relationship such that the product of the collector currents flowing through the transistors $Q_1$ and $Q_2$ is equal to the product of the collector currents flowing through the transistors $Q_3$ and $Q_4$.

Now, an output signal can be derived at the output terminal X that is a function of the current flowing through the load resistor $R_1$. Since this current is the collector current $I_4$ of the transistor $Q_4$, equation (7) can be rewritten so as to define the relationship of the current $I_4$ with respect to the remaining currents $I_1$, $I_2$ and $I_3$ as:

$$I_4 = \frac{I_1 \cdot I_2}{I_3} \quad (8)$$

Figure 3A:
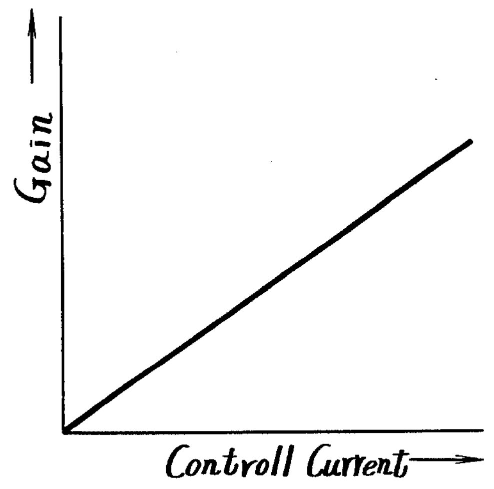
FIGS. 3A and 3B are graphical representations depicting the characteristics obtained from the transistor control circuit of the present invention.

This current relationship can be turned to account so that the illustrated circuit is capable of functioning in various modes of operation. That is, the current $I_4$ which determines the output signal derived at the output terminal X is adapted to represent various functional relationships between the respective currents. For example, if the current source $A_3$ includes a fixed current source such that the current $I_3$ admits of a fixed value, and if the current $A_1$ includes a signaling source so that the current $I_1$ is an input signaling current and, further, if the current source $A_2$ includes a controllable current source such that the current $I_2$ is a control current, the current $I_4$ can be expressed as follows:

$$I_4 = k \cdot I_1 \cdot I_2 \quad (9)$$

where $k$ is a constant that is a function of the fixed current $I_3$. It is thus apparent that the output signal is proportional to the input signal current $I_1$ which is controlled by the control current $I_2$. Stated otherwise, the gain of the transistor control circuit is linearly related to the control current $I_2$ such that a graphical representation of the gain characteristic appears as illustrated in FIG. 3A.

Now, if the current $I_3$ is again fixed but the current source $A_2$ includes a signaling source for supplying an input signal current such that the current $I_2$ corresponds to such input signal current and the current source $A_1$ includes a controlled current source such that the current $I_1$ is a control current, the value of the current $I_4$ is now expressed as:

$$I_4 = k' \cdot I_1 \cdot I_2 \quad (10)$$

where $k'$ is a constant that is determined by the fixed current $I_3$. It is appreciated that in this configuration, as represented by equation (10), the circuit gain again exhibits a linear relationship with respect to the control current, as depicted in FIG. 3A. Thus, as represented by both equations (9) and (10), an output signal is derived that is proportional to the product of an input signal current and a control current. The resultant characteristic curve as illustrated in FIG. 3A is a desirable characteristic curve for a gain control circuit. Thus, the illustrated transistor control circuit can readily admit of a gain controlling application.

Let it now be assumed that the current source $A_2$ includes a fixed current source such that the current $I_2$ is fixed. Now, if the current source $A_1$ includes a signaling source for supplying an input signal current such that the current $I_1$ is an input current and the current source $A_3$ includes a control current source such that the current $I_3$ is a control current, the current $I_4$ can be expressed as:

$$I_4 = K'' \cdot \frac{I_1}{I_3} \quad (11)$$

where $k''$ is a constant to be determined by the value of the fixed current $I_2$. Equation (11) indicates that the input signal current $I_1$ is controlled by the control current $I_3$ inversely with respect to the control current magnitude. Thus, this equation represents that the gain relationship of the transistor control circuit is to be depicted in accordance with the characteristic curve illustrated in FIG. 3B. That is, as the control current $I_3$ increases, the circuit gain decreases in a non-linear fashion.

If the current source $A_1$ includes a fixed current source such that the current $I_1$ is fixed, and if the current source $A_2$ includes a signaling source so that the current $I_2$ is an input signal current and the current source $A_3$ includes a control current source whereby the current $I_3$ is a control current, the expression for the current $I_4$ can be expressed as:

$$I_4 = K''' \cdot \frac{I_2}{I_3} \quad (12)$$

where $k'''$ is a constant that is to be determined by the value of the fixed current $I_1$. Here again, the input signal $I_2$ is seen to be controlled inversely with respect to the control current $I_3$ so that the inverse gain relationship, as graphically represented in FIG. 3B, obtains.

Figure 3B:
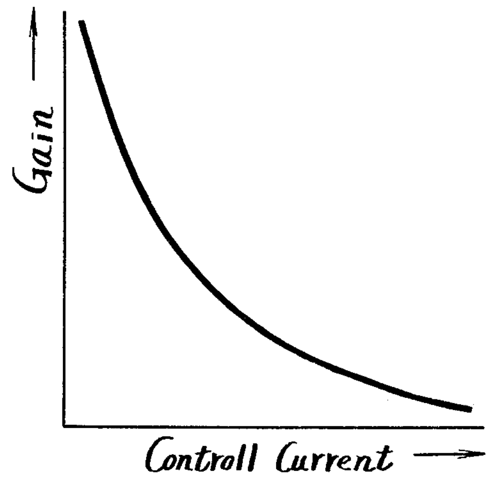

Those of ordinary skill in the art will recognize that a control circuit exhibiting a characteristic curve such as that shown in FIG. 3B admits of ready application as an automatic gain control circuit.

In view of the foregoing description, and in particular, with reference to equation (8) above, it is appreciated that if the currents $I_1$ and $I_2$ comprise input signal currents and the current $I_3$ is a fixed current, the output current $I_4$ is a function of the product of $I_1$ and $I_2$. Consequently, when these conditions obtain, the control circuit is operable as a multiplier circuit.

Thus it is seen that the transistor control circuit of the present invention admits of various modes of operation which can be readily selected merely by designating which of the current sources is to comprise an input signaling source and which is to comprise a control current source. The resultant characteristic curves, as illustrated in FIGS. 3A and 3B thus represent the operating characteristics of the circuit in accordance with the selection of current sources, as aforenoted, and by additionally selecting one of the current sources to include a fixed current source of desired magnitude. As noted above, when the characteristic curve is linear, as in FIG. 3A, the control circuit operates as a multiplier circuit. It is well known that conventional techniques can be used to fabricate the transistor control circuit as an integrated circuit. The particular construction of the current sources will be described with reference to exemplary embodiments hereinbelow: however, it is known that circuits that operate as current sources can readily be fabricated in accordance with integrated circuitry manufacturing techniques. It is apparent that those circuit components which are not readily adaptable for incorporation into an integrated circuit are not used by the control circuit of the present invention. Furthermore, as is appreciated, the construction of the control circuit of the present invention in the form of an integrated circuit results in desirable temperature characteristics because of the substantially symmetrical construction of the circuit.

Various exemplary embodiments of this invention will now be described with reference to FIGS. 4 through 10. In the circuits there illustrated, those elements that correspond to the aforedescribed elements of FIG. 2 are identified by corresponding reference numerals. Furthermore, and in the interest of brevity, since many of these elements are substantially identical, further description thereof is not provided.

Referring now to FIGS. 4 through 9, it is seen that the transistors $Q_1 - Q_4$, together with the load resistor $R_1$ and the source of energizing potential B are all interconnected in the circuit configuration previously described with respect to FIG. 2. The circuits illustrated in these figures depict typical embodiments of various current sources $A_1 - A_3$ and demonstrate how the basic control circuit, as previously described in FIG. 2, is disposed in various modes of operation depending upon the nature of particular current sources. FIGS. 4 through 9 include additional elements that are substantially the same throughout. For example, a signal source S is provided to generate an input signal, such as a video signal that is generated in a television receiver. Of course, any other input signal source can be used to generate an input signal which usually represents information. In addition, a variable DC voltage source $E_1$ is provided to generate a DC voltage having a variable magnitude which can be used as a controllable voltage. Constant voltage sources $E_2$ and $E_3$ are provided for generating DC voltages of fixed magnitude.

Figure 4:
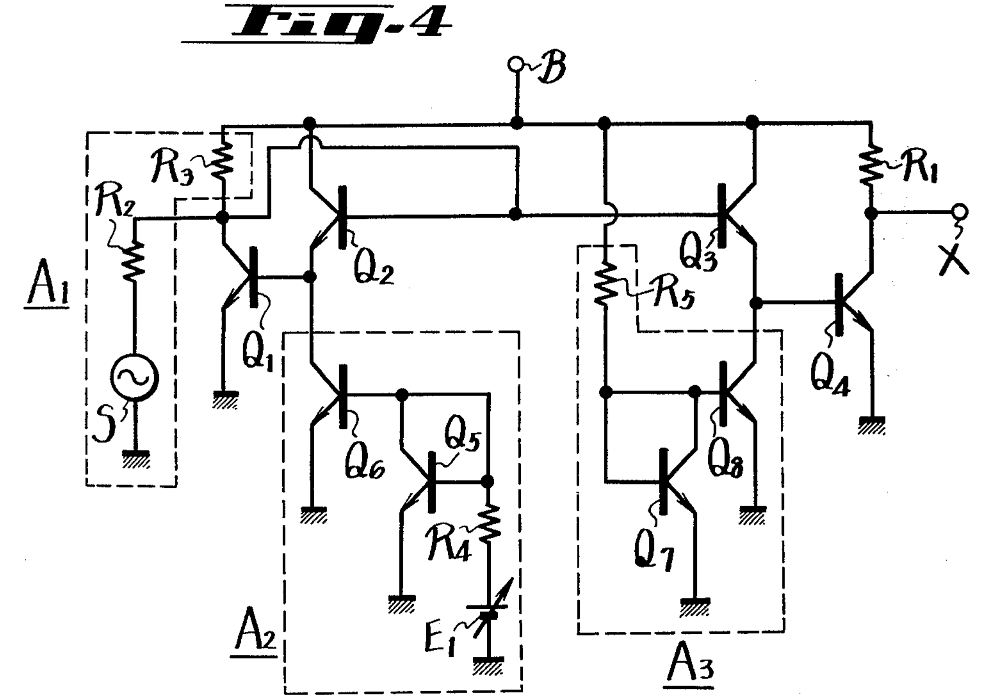
FIGS. 4 through 10 are schematic diagrams showing various embodiments of the transistor control circuit of the present invention.

Turning now more particularly to FIG. 4, an exemplary embodiment of the present invention is shown in which the current source $A_1$ includes the signal source S such that the current $I_1$ generated by the current source $A_1$ is designated an input current. In addition, the current source $A_2$ includes the variable DC voltage source $E_1$ such that the current $I_2$ produced by the current source $A_2$ is a control current. Finally, the current source $A_3$ is adapted to produce a fixed current, so that the embodiment of FIG. 4 exhibits the characteristic curve depicted in FIG. 3A. The current source $A_1$ is comprised of a series circuit formed of the signal source S and resistors $R_2$ and $R_3$. This series circuit is connected to the source of energizing potential B, and in particular, is connected between such source and ground. The junction defined by the series connected resistors $R_2$ and $R_3$ is connected to the collector electrode of the transistor $Q_1$. Hence, it is appreciated that the input signal current $I_1$ flows through the collector-emitter circuit of the transistor $Q_1$.

The current source $A_2$ is comprised of the variable DC voltage source $E_1$ and is connected in common to the respective base electrodes of transistors $Q_5$ and $Q_6$ by the resistor $R_4$. The collector and base electrodes of the transistor $Q_5$ are tied together and connected to the base electrode of the transistor $Q_6$, the latter having an emitter electrode that is connected in common with the emitter electrode of the transistor $Q_5$. This current source $A_2$ is connected to the transistor $Q_2$ by interconnecting the emitter electrode of the transistor $Q_2$ with the collector electrode of the transistor $Q_6$. The variable DC voltage source $E_1$ preferably supplies a positive potential to the transistors $Q_5$ and $Q_6$ such that a control current $I_2$ flows from the emitter electrode of the transistor $Q_2$, the magnitude of the control current being determined by the variable DC voltage source, as is recognized.

The current source $A_3$ is adapted to supply a fixed current $I_3$ and is comprised of transistors $Q_7$ and $Q_8$, that are energized from the source of energizing potential B. More particularly, the collector electrode of the transistor $Q_7$ is tied to the base electrode thereof and is connected to the base electrode of the transistor $Q_8$, the collector electrode of the latter transistor being connected to the emitter electrode of the transistor $Q_3$. A resistor $R_5$ supplies an energizing voltage to the common connected base electrodes of the transistors $Q_7$ and $Q_8$ from the source B. The magnitude of the current $I_3$ supplied by the current source $A_3$ is seen to be of a constant value that is determined by the magnitude of the energizing potential supplied by the source B.

Figure 5:
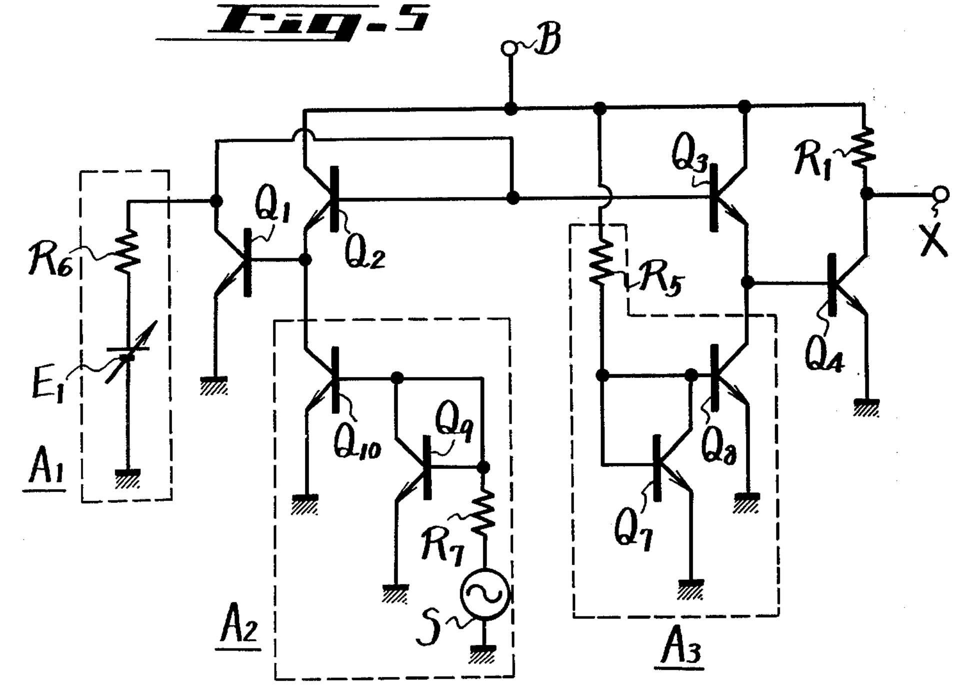
Figure 6:
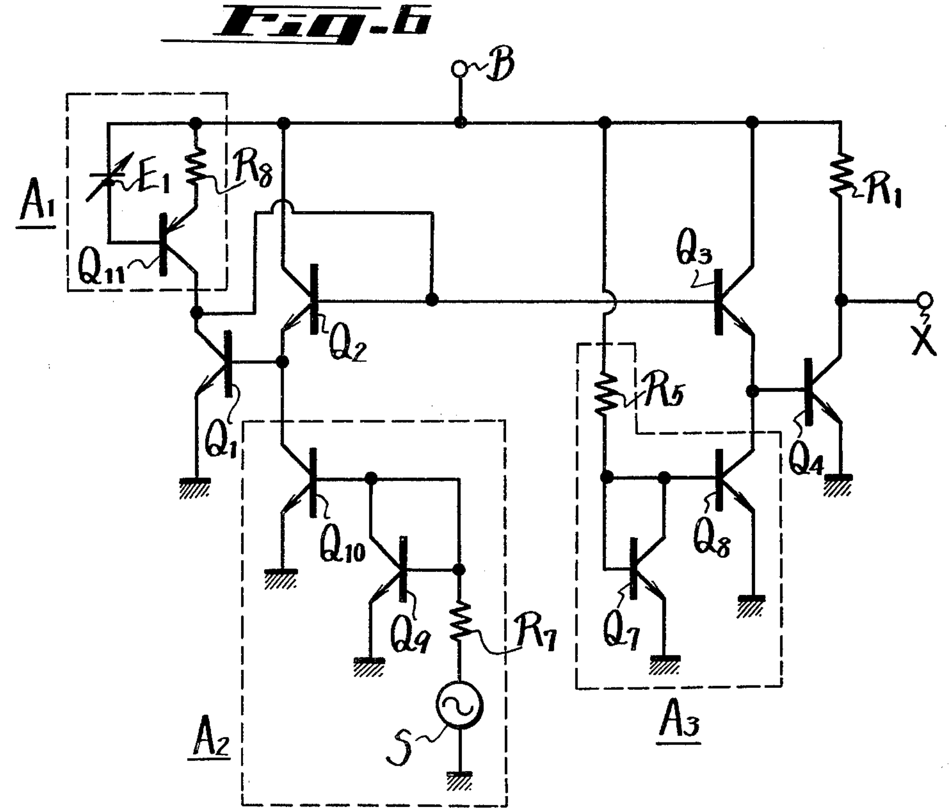
Figure 7:
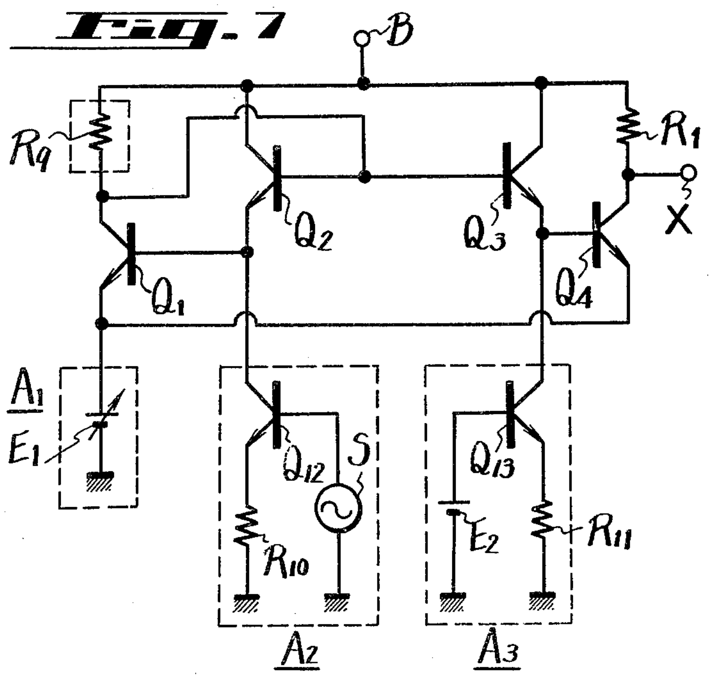

In the embodiments depicted in FIGS. 5 – 7, now to be described, it will be seen that the current $I_1$ now corresponds to the control current and that the current $I_2$ now comprises the input signal current. However, as just described, the current $I_3$ comprises a fixed current.

Referring now to FIG. 5, the current source $A_1$ comprises the variable DC voltage source $E_1$ connected in series with a resistor $R_6$ to the collector electrode of the transistor $Q_1$. Hence, as the variable voltage produced by the DC voltage source $E_1$ varies, the control current $I_1$ likewise varies.

The current source $A_2$ now includes the signal source S which is connected by a resistor $R_7$ to the transistors $Q_9$ and $Q_{10}$. It may be appreciated that the transistors $Q_9$ and $Q_{10}$ are interconnected with each other and to the emitter electrode of the transistor $Q_2$ in substantially the same manner as the transistors $Q_5$ and $Q_6$ of the current source $A_2$ previously described in FIG. 4. Hence, as the signal source S varies in accordance with the input signal, the input signal current $I_2$ correspondingly varies.

As is apparent, the current source $A_3$ of FIG. 5 is identical to the current source $A_3$ of FIG. 4. Accordingly, no further description of the current source $A_3$ need be provided.

In accordance with the embodiment now under discussion, it is appreciated that, since the current $I_1$ is selected as the control current having a magnitude derived from the DC voltage source $E_1$, and since the current $I_2$ is selected as the input signal current that varies in accordance with the variations of the signal source S, and since the current $I_3$ is selected to be of a fixed magnitude, then the output current $I_4$ can be represented in accordance with equation (10) above. The output signal produced at the output terminal X can be changed merely by changing the voltage produced by the DC voltage source $E_1$ as desired.

Referring now to FIG. 6, this embodiment of the control circuit admists of a mode of operation that is substantially similar to that just described. The control current $I_1$ is produced by the current source $A_1$ which is comprised of a transistor $Q_{11}$ having its base electrode connected through the variable DC voltage source $E_1$ to the source of energizing potential B and having its emitter electrode connected to the source B by a resistor $R_8$. The collector electrode of the transistor $Q_{11}$ is connected to the collector electrode of the transistor $Q_1$. The transistor $Q_{11}$ is preferably of the opposite conductivity type than that of each of the transistors $Q_1$ through $Q_4$. Accordingly, if the transistors $Q_1$ are NPN transistors, then the transistor $Q_{11}$ is a PNP transistor. Of course, the opposite conductivity relationship can obtain. If the transistor $Q_{11}$ comprises a PNP transistor, it is appreciated that the variable DC voltage source $E_1$ supplies a relatively negative potential to the base electrode of that transistor. Hence, the control current $I_1$ will be supplied to the transistor $Q_1$ in accordance with the setting of the DC voltage source $E_1$. As this voltage source is adjusted to produce a different DC voltage, the magnitude of the control current $I_1$ will likewise vary.

The current sources $A_2$ and $A_3$ in the embodiment of FIG. 6 are identical to the current sources $A_2$ and $A_3$ previously described with respect to FIG. 5. Accordingly, in the FIG. 6 circuit, the output current $I_4$ is defined by aforenoted equation (10). As is now appreciated, the output signal derived from the output terminal X can be varied, as desired, in accordance with a corresponding variation in the DC voltage source $E_1$.

In the embodiment shown in FIG. 7, the current source $A_1$ is comprised of the variable DC voltage source $E_1$ which is connected in common to the emitter electrodes of the transistors $Q_1$ and $Q_4$. In addition, a resistor $R_9$ is provided to connect the collector electrode of the transistor $Q_1$ to the source of energizing potential B. The combination of the DC voltage source $E_1$ and the resistor $R_9$ cause a control current $I_1$ to flow through the transistor $Q_1$ having a magnitude that is dependent upon the voltage produced by the DC voltage source $E_1$. This control current is adapted to change in accordance with a corresponding change in the voltage producd by the source $E_1$, as desired.

The current source $A_2$ is comprised of the signal source S which is connected to the base electrode of a transistor $Q_{12}$. The collector-emitter circuit of this transistor is connected in series between the emitter electrode of the transistor $Q_2$ and ground and further includes, in this series circuit, the emitter resistor $R_{10}$. Accordingly, the current source $A_2$ is adapted to supply an input signal current that varies as a function of the variations of the signal source S.

The fixed current $I_3$ is supplied by the current source $A_3$ which is comprised of the fixed DC voltage source $E_2$ connected to the base electrode of a transistor $Q_{13}$. The collector-emitter circuit of this transistor is connected in a series circuit between the emitter electrode of the transistor $Q_3$ and ground. Included in this series circuit is the emitter resistor $R_{11}$.

Thus it is seen that the FIG. 7 embodiment operates such that the output current $I_4$ can be represent by equation (10). An adjustment of the variable DC voltage source $E_1$, as desired, produces a corresponding change in the control current $I_1$ which, in turn, correspondingly changes the output current $I_4$ in accordance with this equation.

Figure 8:
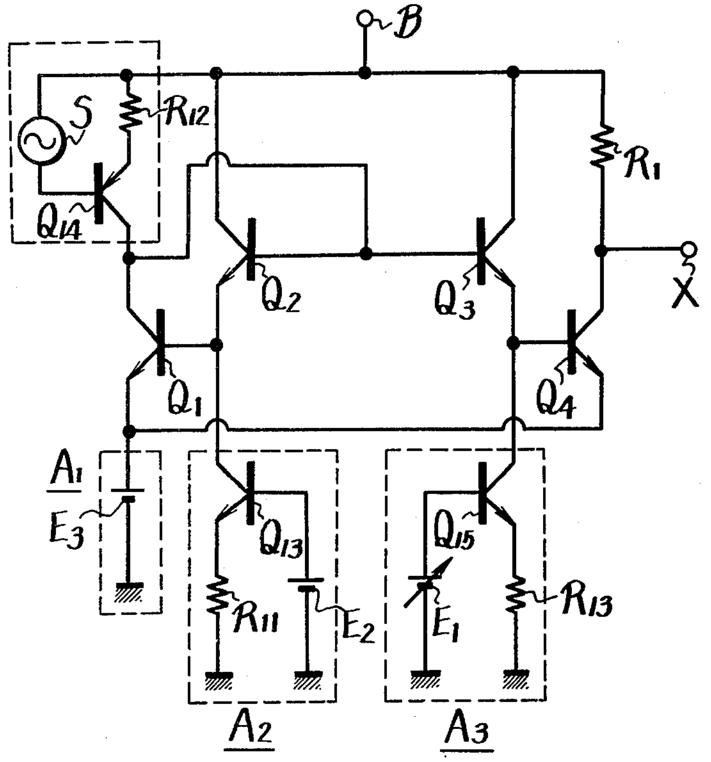

Referring to FIG. 8, the embodiment therein illustrated is provided with the current $I_1$ as the input signal current, the current $I_3$ as the control current and the current $I_2$ as the fixed current. Accordingly, the operation of this embodiment is represented by equation (11) and exhibits a characteristic curve of the type shown in FIG. 3B. The current source $A_1$ for supplying the input signal current $I_1$ is comprised of the signal source S which is connected to the base electrode of a transistor $Q_{14}$. The collector-emitter circuit of this transistor is connected in a series circuit which couples the collector electrode of the transistor $Q_1$ to the source of energizing potential B. This series circuit includes a registor $R_{12}$. In the preferred embodiment, the transistor $Q_{14}$ is of a conductivity type which is opposite to the conductivity types of the transistors $Q_1$ through $Q_4$. In a typical embodiment, the transistor $Q_{14}$ is a PNP transistor having its emitter electrode connected through the resistor $R_{12}$ to the source B. As shown, the signal source S is connected between this source B and the base electrode of the transistor. The current source $A_1$ additionally includes the fixed DC voltage source $E_3$ which is adapted to supply a relatively positive potential to the respective emitter electrodes of the transistors $Q_1$ and $Q_4$. Accordingly, the current source $A_1$, as here illustrated, is seen to supply an input signal $I_1$ having variations corresponding to the variations of the signal source S.

The current source $A_2$ includes a fixed current source such that the current $I_2$ is of constant magnitude and is thus seen to be substantially identical to the current source $A_3$ previously described with respect to FIG. 7.

The control current $I_3$ supplied by the current source $A_3$ is obtained from the control current source included in the current source $A_3$ which comprises the variable DC voltage source $E_1$ connected to the base electrode of a transistor $Q_{15}$. The collector-emitter circuit of this transistor is connected in a series circuit between the emitter electrode of the transistor $Q_3$ and ground. This series circuit includes the emitter-resistor $R_{13}$. As is appreciated, the magnitude of the control $I_3$ can be adjusted, as desired, in accordance with a corresponding adjustment of the variable DC voltage source $E_1$. Such variations may, of course, be effected in a conventional manner and in accordance with a predetermined design. For example, the circuit illustrated FIG. 8 finds ready application as an automatic gain control circuit.

Figure 9:
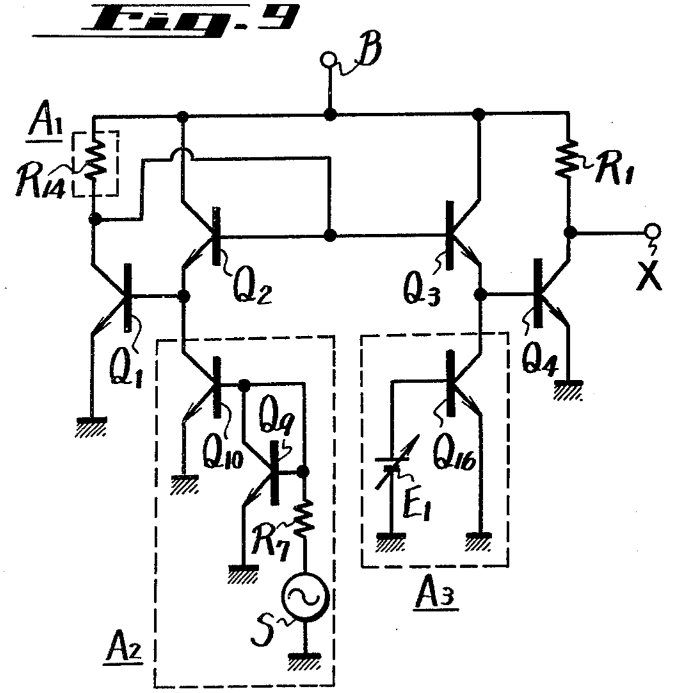

In the embodiment shown in FIG. 9, the current $I_1$ is selected to be a fixed current, the current $I_2$ is selected to be the input signal current and the current $I_3$ is selected to be the control current. Thus, the illustrated circuit operates in a manner defined by equation (12) and exhibits a characteristic curve of the type shown in FIG. 3B. In supplying the fixed current $I_1$, the current source $A_1$ is seen to comprise a resistor $R_{14}$ which connects the collector electrode of the transistor $Q_1$ to the source of energizing potential B.

The input signal current $I_2$ is adapted to be produced in the same manner as previously described with respect to FIG. 5. Accordingly, the current source $A_2$ of FIG. 9 is identical to the current source $A_2$ of FIG. 5.

The current source $A_3$ is comprised of the variable DC voltage source $E_1$ connected to the base electrode of a transistor $Q_{16}$. The collector electrode of this transistor is connected to the emitter electrode of the transistor $Q_3$, and the emitter electrode of the transistor $Q_{16}$ is coupled to ground.

In the FIG. 9 embodiment, it is appreciated that the fixed current $I_1$ is dependent upon the magnitude of the energizing potentials supplied by the source B, the input signal current $I_2$ admits the variations in correspondence with the variations of the signal source S and the control current $I_3$ is proportional to the magnitude of the voltage produced by the variable DC voltage source $E_1$ and thus may be varied, as desired, in accordance with variations of the DC voltate source.

Figure 10:
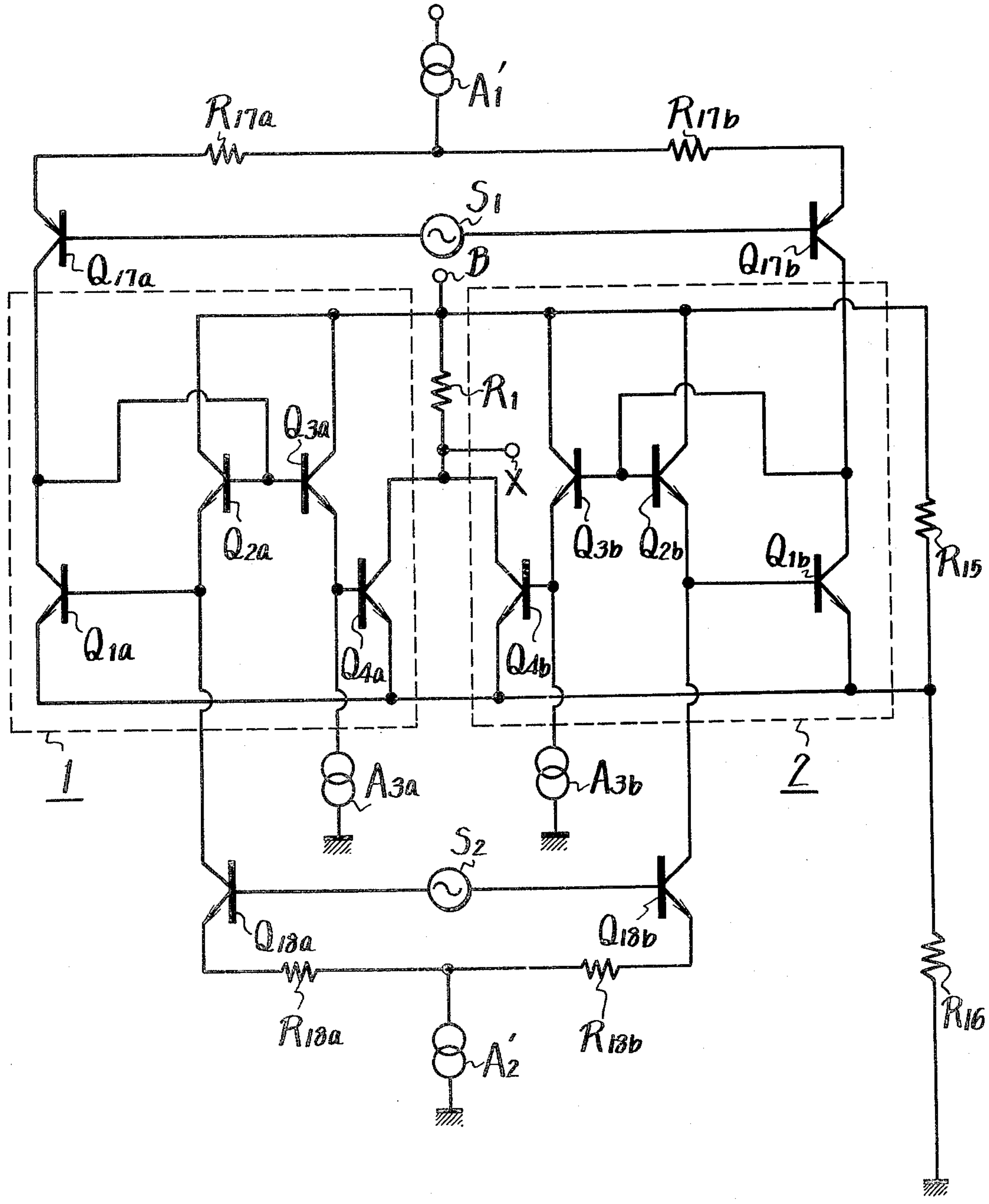

A particular embodiment of the control circuit of the present invention finding ready application as a multiplier circuit will now be described with reference to FIG. 10. The illustrated multiplier circuit is comprised of two substantially similar control circuits 1 and 2, which are comprised of transistors $Q_{1a}$ – $Q_{4a}$ and $Q_{1b}$ – $Q_{4b}$, respectively. The respective control circuits 1 and 2 are each arranged in the circuit configuration previously described with respect to each of the aforenoted embodiments. Thus, the corresponding transistors in each of the control circuits can be considered as transistor pairs. It is seen that, in the transistor pair comprised of transistors $q_{4a}$ and $Q_{4b}$, the respective collector electrodes are connected in common through a common load resistor $R_1$ to the source of energizing potential B. Additionally, the output terminal X is connected to the common connected collector electrodes of these transistors. The emitter electrodes of the respective $Q_1$ and $Q_4$ transistor pair, i.e., transistors $Q_{1a}$, $Q_{1b}$ and $Q_{4a}$, $Q_{4b}$, are connected to a reference potential that is here derived from a conventional voltage divider circuit. In particular, the energizing potential supplied by the source B is divided by the series connected resistors $R_{15}$ and $R_{16}$ which are connected across the source of energizing potential. Accordingly, the reference potential obtained at the junction defined by these series connected resistors is supplied to the respective emitter electrodes of the $Q_1$and $Q_4$ transistor pairs.

A current source $A_1$, is adapted to supply a first current $I_1$ to the $Q_1$ transistor pairs. Accordingly, this current source is connected through a resistor $R_{17a}$ and through the collector-emitter circuit of a transistor $Q_{17a}$ to the collector electrode of the transistor $Q_{1a}$. Similarly, the current source $A_1$, is connected through a resistor $R_{17b}$ and through the collector-emitter circuit of a transistor $Q_{17b}$ to the collector electrode of the transistor $Q_{1b}$. Preferably, the resistors $R_{17a}$ and $R_{17b}$ are substantially identical, as are the transistors $Q_{17a}$ and $Q_{17b}$. Moreover, these latter transistors are of a conductivity type that is opposite to the conductivity type of the control circuit transistor pairs. In the illustrated embodiment, the transistors $Q_{17a}$ and $Q_{17b}$ are PNP transistors.

A first signal source $S_1$ is connected across the respective base electrodes of the transistors $Q_{17a}$ and $Q_{17b}$. Accordingly, these transistors are adapted to supply first input signal currents $I_{1a}$ and $I_{1b}$ through the respective control circuits 1 and 2. As is appreciated, these input signal currents admit of variations corresponding to the variations of the first signal source $S_1$.

A second current source $A_{2'}$ is adapted to supply currents $I_2$ to the $Q_2$ transistor pairs of the control circuits. Accordingly, the current source $A_{2'}$ is connected through a resistor $R_{18a}$ and through the collector-emitter circuit of a transistor $Q_{18a}$ to the emitter electrode of the transistor $Q_{2a}$. Additionally, this current source is connected through a resistor $R_{18b}$ and through the collector-emitter circuit of a transistor $Q_{18b}$ to the emitter electrode of the transistor $Q_{2b}$. In the illustrated embodiment, the currents $I_2$ are adapted to be input signal currents exhibiting variations corresponding to the variations of a signal source. Accordingly, a second signal source $S_2$ is connected across the respective base electrodes of the transistors $Q_{18a}$ and $Q_{18b}$ such that second input signal currents $I_{2a}$ and $I_{2b}$ are respectively supplied to the control circuits 1 and 2. As is appreciated, the signal source $S_2$, as well as the signal source $S_1$, supplies signaling voltages at its output terminals admitting of opposite polarities.

In the illustrated multiplier circuit, the currents $I_3$ are adapted to be fixed currents. Accordingly, the respective emitter electrodes of the $Q_3$ transistor pair are connected to current sources, such as $A_{3a}$ and $A_{3b}$, respectively, which are adapted to supply fixed currents $I_{3a}$ and $I_{3b}$ to the control circuits 1 and 2. These current sources $A_{3a}$ and $A_{3b}$ may be of the type previously described with respect to the current source $A_3$ shown in FIGS. 4 and 8.

Now, when the signaling voltage generated by the signal source $S_1$ is supplied across the base electrodes of the transistors $Q_{17a}$ and $Q_{17b}$, these transistors operate as current sources such that the value of the currents flowing through their respective collector-emitter circuits, as supplied by the current source $A_{1'}$ is varied in accordance with the signal source variations. The transistors $Q_{17a}$ and $Q_{17b}$, as well as their respective emitter resistors $R_{17a}$ and $R_{17b}$, are selected such that if the current flowing through the transistor $Q_{17a}$ is designated $I_{1a}$, and the current flowing through the transistor $Q_{17b}$ is designated $I_{1b}$, the following equation obtains:

$$I_{1a} = -I_{1b} \quad (13)$$

In a similar manner, the signaling voltage generated by the signal source $S_2$ is supplied across the respective base electrodes of the transistors $Q_{18a}$ and $Q_{18b}$ such that these transistors effectively operate as current sources such that the currents flowing through their respective collector-emitter circuits, as supplied by the current source $A_2$ are varied in accordance with the signal source variations. These transistors, together with their respective emitter resistors, are selected such that the signal current flowing through the transistor $Q_{18a}$, designated $I_{2a}$, and the signal current flowing the transistor $Q_{18b}$, designated $I_{2b}$, admit of the following equation:

$$I_{2a} = -I_{2b} \quad (14)$$

Now, if the currents supplied by the current sources $A_{3a}$ and $A_{3b}$ are equal and are designated $I_{3a}$ and $I_{3b}$, these fixed currents exhibit the relationship:

$$I_{3a} = I_{3b} \quad (15)$$

It is thus seen that each of the control circuits 1 and 2 operates in a manner which satisfies equations (9) and (10) such that currents $I_{4a}$ and $I_{4b}$ that flow through the common connected transistors $Q_{4a}$ and $Q_{4b}$ can be expressed as follows:

$$I_{4a} = k \cdot I_{1a} \cdot I_{2a} \quad (16)$$

$$I_{4b} = k \cdot I_{1b} \cdot I_{2b} \quad (17)$$

It is recognized that $k$ in each of the equations (16) and (17) is a constant determined by the fixed currents $I_{3a}$ and $I_{3b}$. Since the current flowing through the load resistor $R_1$ is a function of the sum of the currents $I_{4a}$ and $I_{4b}$, this current may be designated $I_4$ to satisfy the equation:

$$I_4 = I_{4a} + I_{4b} = k\ (I_{1a} \cdot I_{2a} + I_{1b} \cdot I_{2b}) \quad (18)$$

Therefore, it may now be readily appreciated that the signal derived at the output terminal X, which is a function of the current $I_4$, is dependent upon the product of the signals produced by the respective input signal sources $S_1$ and $S_2$. As such output signal is proportional to the product of the input signals, it is now fully recognized that the embodiment depicted in FIG. 10 operates as a multiplier circuit.

While the invention has been particularly shown and described with reference to exemplary embodiments thereof, it will be obvious to those skilled in the art that various changes and modifications in form and details may be made without departing from the spirit and scope of the invention. For example, various embodiments of the resepective current sources, such as the input signal current source, the control current source and the fixed current source, can be used with the present invention. Furthermore, the respective transistors illustrated and described herein may comprise individual transistor devices or may be replaced by equivalent transistor circuits functioning as such transistor devices. It is therefore intended that the appended claims be interpreted as including the foregoing as well as all other such changes and modifications.

What is claimed is:

1. A transistor control circuit comprising:

first transitor means;

second transistor means having an emitter electrode connected to the base electrode of said first transistor means;

third transistor means having a base electrode connected to the base electrode of said second transistor means;

fourth transistor means having a base electrode connected to the emitter electrode of said third transistor means;

a first current source for supplying a first current to flow through said first transistor means;

a second current source connected to said emitter electrode of said second transistor means for supplying a second current;

a third current source connected to said emitter electrode of said third transistor means for supplying a third current;

means for connecting said base electrodes of said second and third transistor means to the collector electrode of said first transistor means; and means for deriving an output signal from the collector electrode of said fourth transistor means, said output signal being a function of said first, second and third currents.

2. A transistor control circuit in accordance with claim 1 further comprising means for controlling the current supplied by at least one of said current sources.

3. A transistor control circuit in accordance with claim 2 further comprising means for supplying first energizing potentials to said second and third transistor means and second energizing potentials to said first and fourth transistor means.

4. A transistor control circuit in accordance with claim 3 wherein said first current source includes a signaling source for supplying an input signal current; said third current source comprises a fixed current source; and said second current source includes said current controlling means, such that the amplitude of said output signal is proportional to the product of said input signal current and said controlled current.

5. A transistor control circuit in accordance with claim 3 wherein said second current source includes a signaling source for supplying an input signal current; said third current source comprises a fixed current source; and said first current source includes said current controlling means, such that the amplitude of said output signal is proportional to the product of said input signal current and said controlled current.

6. A transistor control circuit in accordance with claim 5 wherein said first current source comprises a series circuit formed of a resistor and a direct-current voltage source having a controllable output voltage.

7. A transistor control circuit in accordance with claim 5 wherein said first current source comprises transistor means having a collector electrode connected to said collector electrode of said first transistor means and an emitter electrode connected to said energizing potential supply means through a resistor; and a direct-current voltage source connected to the base electrode of said transistor means.

8. A transistor control circuit in accordance with claim 5 wherein said first current source comprises a variable direct-current voltage source connected to the emitter electrode of said first transistor and wherein the collector electrode of said first transistor means is connected to said energizing potential supply means through a resistor.

9. A transistor control circuit in accordance with claim 3 wherein said first current source includes a signaling source for supplying an input signal current; said second current source comprises a fixed current source; and said third current source includes said current controlling means, such that the amplitude of said output signal is proportional to the quotient of said input signal current divided by said controlled current.

10. A transistor control circuit in accordance with claim 9 wherein said third current source comprises transistor means having its collector-emitter circuit connected to the emitter electrode of said third transistor means; and a variable direct-current voltage source connected to the base electrode of said transistor means.

11. A transistor control circuit in accordance with claim 1 wherein said first current source includes a signaling source for supplying a first input signal; and said second current source includes a signaling source for supplying a second input signal, such that said output signal is a product of said first and second input signals.

12. A transistor control circuit in accordance with claim 1 wherein one of said current sources includes a signaling source for supplying an input signal current; another of said current sources includes means for controlling the current supplied thereby; and the other of said current sources comprises a fixed current source.

13. A multiplier circuit comprising:

a first pair of transistors;

a second pair of transistors each having an emitter electrode connected to a respective base electrode of said first pair of transistors;

a third pair of transistors each having a base electrode connected to a respective base electrode of said second pair of transistors;

a fourth pair of transistors each having a base electrode connected to a respective emitter electrode of said third pair of transistors;

first current source means including a first signaling source for supplying first input signal currents through said first pair of transistors;

second current source means connected to the emitter electrodes of said second pair of transistors and including a second signaling source for supplying second input signal currents;

third current source means connected to the emitter electrodes of said third pair of transistors and including a fixed current source;

means for connecting each of the collector electrodes of said first pair of transistors to a respective base electrode of said second pair of transistors; and means connected in common to the collector electrodes of said fourth pair of transistors through which flows an output current that is proportional to the product of said first and second input signal currents.

* * * * *